US012073755B2

(12) United States Patent
Kang

(10) Patent No.: US 12,073,755 B2
(45) Date of Patent: Aug. 27, 2024

(54) BRIGHTNESS MATCHING METHOD OF DISPLAY AND THE DISPLAY

(71) Applicants: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

(72) Inventor: Xinyi Kang, Huizhou (CN)

( * ) Notice: Subject to any disclaimer, the term of this patent is extended or adjusted under 35 U.S.C. 154(b) by 0 days.

(21) Appl. No.: 17/622,825

(22) PCT Filed: Dec. 23, 2021

(86) PCT No.: PCT/CN2021/140747
§ 371 (c)(1),
(2) Date: Dec. 26, 2021

(87) PCT Pub. No.: WO2023/103102
PCT Pub. Date: Jun. 15, 2023

(65) Prior Publication Data

US 2024/0029615 A1 Jan. 25, 2024

(30) Foreign Application Priority Data

Dec. 9, 2021 (CN) ......................... 202111495660.8

(51) Int. Cl.
*G09G 3/20* (2006.01)
*G09G 3/32* (2016.01)
*G09G 3/36* (2006.01)

(52) U.S. Cl.
CPC ............. *G09G 3/2007* (2013.01); *G09G 3/32* (2013.01); *G09G 3/36* (2013.01);
(Continued)

(58) Field of Classification Search
CPC .......... G09G 3/2007; G09G 3/32; G09G 3/36; G09G 2300/026; G09G 2320/0233; G09G 2320/0693
See application file for complete search history.

(56) References Cited

U.S. PATENT DOCUMENTS

2012/0069022 A1 3/2012 Majumder et al.
2022/0319376 A1* 10/2022 Shi ....................... G09G 3/2003

FOREIGN PATENT DOCUMENTS

CN 102750931 A 10/2012
CN 105448230 A 3/2016
(Continued)

OTHER PUBLICATIONS

Chinese Office Action issued in corresponding Chinese Patent Application No. 202111495660.8 dated May 11, 2023, pp. 1-10.
(Continued)

*Primary Examiner* — Robert J Michaud

(57) ABSTRACT

The present disclosure relates to a brightness matching method of a display and the display. The method includes: performing first calibration on a brightness of at least one second display panel according to first calibration information to obtain a first calibration brightness; performing second calibration on the brightness of the at least one second display panel according to second calibration information to obtain a second calibration brightness; and performing third calibration on the brightness of the at least one second display panel according to the first calibration brightness and the second calibration brightness to obtain a third calibration brightness to match the brightness of the at least one second display panel with a brightness of at least one first display panel.

18 Claims, 3 Drawing Sheets

(52) U.S. Cl.
CPC ................ *G09G 2300/026* (2013.01); *G09G 2320/0233* (2013.01); *G09G 2320/0693* (2013.01)

(56) References Cited

FOREIGN PATENT DOCUMENTS

| | | | | | |
|---|---|---|---|---|---|
| CN | 107170424 | A | | 9/2017 | |
| CN | 109658862 | A | | 4/2019 | |
| CN | 110120207 | A | | 8/2019 | |
| CN | 111402825 | A | | 7/2020 | |
| CN | 111554246 | A | | 8/2020 | |
| CN | 112150965 | A | | 12/2020 | |
| CN | 112542132 | A | | 3/2021 | |
| CN | 113450736 | A | | 9/2021 | |
| CN | 111402825 | B | * | 8/2022 | ............... G09G 3/36 |

OTHER PUBLICATIONS

International Search Report in International application No. PCT/CN2021/140747,mailed on Sep. 7, 2022.
Written Opinion of the International Search Authority in International application No. PCT/CN2021/140747,mailed on Sep. 7, 2022.

* cited by examiner

BRIGHTNESS MATCHING METHOD OF DISPLAY AND THE DISPLAY

TECHNICAL FIELD

The present disclosure relates to the display technology field, and more particularly to a brightness matching method of a display and the display.

BACKGROUND ART

Since processing technologies of liquid crystal panels are limited, black seams between LCD (Liquid Crystal Display) splicing screens cannot eliminated in the prior art. LEDs (i.e., Light-Emitting Diode) are not provided with circuits around them, which can achieve seamless effect. Therefore, in the prior art, LEDs are disposed between the splicing seams of the LCD splicing screens, so as to effectively eliminate the black seams between the LCD splicing screens.

In the prior art, guaranteeing consistency of display effect of LEDs and LCDs is one of major difficulties to achieve a seamless connection. For example, in terms of brightness, light is emitted from backlight pates in the LCD screens and then is perceived by the human eyes after action of liquid crystals and polarizers. Light emitted by the LEDs can be directly perceived by the human eyes due to its self-luminous properties. Accordingly, when brightness of the LEDs and the LCDs is not processed, the brightness of the LEDs is higher than the brightness of the LCDs.

In the prior art, a point-by-point correction technology are generally used for adjusting the brightness of the LED screens. The point-by-point correction technology can collect the brightness of each pixel area on the LED screens, give a corresponding correction coefficient, and feed it back to a control system to realize a differential drive for each pixel area of the LED screens.

However, in the related art, there is an error in adjusting the brightness of the LED screens based on the brightness of the LCD screens measured by a colorimeter. In a practical working process, the brightness of the LED screens adjusted based on the brightness of the LCD screens measured by the colorimeter is inconsistent with the brightness of the LEDs actually observed by naked eyes. Therefore, a problem of how to guarantee the consistency of the display effect of the LEDs and the LCDs is an urgent problem to be solved.

Technical Problem

In the prior art, the present disclosure mainly aims to the technical problem of how to ensure the consistency of the display effect of the LEDs and the LCDs.

Technical Solution

In view of this, the present disclosure provides a brightness matching method of a display and the display capable of solving the problem that a brightness of at least one second display in a splicing screen is inconsistent with a brightness of at least one first display panel, avoiding a difference between the brightness of the at least one second display panel which is calibrated and the brightness of the at least one second display panel which is actually observed, and increasing the consistency of display effect of the at least one second display panel and the at least one first display panel.

According to an aspect of the present disclosure, a brightness matching method of a display is provided. The display includes at least one first display panel and at least one second display panel. The at least one first display panel and the at least one second display panel are spliced together. The brightness matching method of the display includes: obtaining first calibration information of the at least one first display panel by a calibration instrument; performing first calibration on a brightness of the at least one second display panel according to the first calibration information to obtain a first calibration brightness of the at least one second display panel; obtaining second calibration information of the at least one second display panel by a user; performing second calibration on the brightness of the at least one second display panel according to the second calibration information to obtain a second calibration brightness of the at least one second display panel; and performing third calibration on the brightness of the at least one second display panel according to the first calibration brightness and the second calibration brightness to obtain a third calibration brightness of the at least one second display panel to match the brightness of the at least one second display panel with a brightness of the at least one first display panel.

Further, the obtaining the second calibration information of the at least one second display panel by the user includes: determining whether the first corrected brightness of the at least one second display panel is consistent with the brightness of the at least one second display panel which is actually observed; and obtaining the second calibration information of the at least one second display panel by the user, when the first calibration brightness of the at least one second display panel is inconsistent with the brightness of the at least one second display panel which is actually observed.

Further, the determining whether the first corrected brightness of the at least one second display panel is consistent with the brightness of the at least one second display panel which is actually observed includes: displaying a display image which is the same as a display image displayed on the at least one first display panel on the at least one second display panel based on the first calibration brightness; and determining, according to a brightness of the display image of the at least one second display panel and a brightness of the display image of the at least one first display panel, whether the first calibration brightness of the at least one second display panel is consistent with the brightness of the at least one second display panel which is actually observed.

Further, the obtaining the first calibration information of the at least one first display panel by the calibration instrument includes: displaying a display image which is the same as a display image displayed on the at least one first display panel on the at least one second display panel; and obtaining the first calibration information of the at least one first display panel by the calibration instrument, wherein the first calibration information includes a first display brightness of the at least one first display panel and a second display brightness of the at least one second display panel.

Further, the obtaining the second calibration information of the at least one second display panel by the user includes: obtaining a range of grayscales of the at least one second display panel; selecting at least one binding point grayscale within the range of the grayscales of the at least one second display panel; and obtaining the second calibration information of the at least one second display panel by the user according to the at least one binding point grayscale, wherein the second calibration information includes a brightness of the at least one second display panel corresponding to the at least one binding point grayscale.

Further, the performing the third calibration on the brightness of the at least one second display panel according to the first calibration brightness and the second calibration brightness to obtain the third calibration brightness of the at least one second display panel includes: generating a first gain coefficient corresponding to the at least one binding point grayscale according to the first calibration brightness and the second calibration brightness; performing a linear interpolation based on the first gain coefficient corresponding to the at least one binding point grayscale to obtain a second gain coefficient corresponding to a brightness of the at least one second display panel at each level; and performing the third calibration on the brightness of the at least one second display panel according to the second gain coefficient to obtain the third calibration brightness of the at least one second display panel.

Further, a display image of the display includes a plurality of colors, and the first calibration brightness, the second calibration brightness, and the third calibration brightness respectively correspond to the colors of the display image of the display.

Further, the calibration instrument includes a colorimeter or a spectrometer.

Further, a range of grayscales of the at least one second display panel is the same as a range of grayscales of the at least one first display panel.

Further, the at least one first display panel is an LCD display panel, and the at least one second display panel is an LED display panel.

According to another aspect of the present disclosure, a display is provided. The display includes: a first obtaining module electrically connected to a first calibrating module, wherein the first obtaining module is configured to obtain first calibration information of at least one first display panel by a calibration instrument; the first calibrating module electrically connected to the first obtaining module and a second obtaining module, wherein the second obtaining module is configured to perform first calibration on a brightness of at least one second display panel according to the first calibration information to obtain a first calibration brightness of the at least one second display panel; the second obtaining module electrically connected to the first calibrating module and a second calibrating module, wherein the second calibrating module is configured to obtain second calibration information of the at least one second display panel by a user; the second calibrating module electrically connected to the second obtaining module and a third calibrating module, wherein the second calibrating module is configured to perform second calibration on the brightness of the at least one second display panel according to the second calibration information to obtain a second calibration brightness of the at least one second display panel; and the third calibrating module electrically connected to the second calibrating module, wherein the third calibrating module is configured to perform third calibration on the brightness of the at least one second display panel according to the first calibration brightness and the second calibration brightness to obtain a third calibration brightness of the at least one second display panel to match the brightness of the at least one second display panel with a brightness of the at least one first display panel.

Further, the second obtaining module includes: a determining module configured to determining whether the first corrected brightness of the at least one second display panel is consistent with the brightness of the at least one second display panel which is actually observed; and a second calibration information obtaining sub-module configured to obtain the second calibration information of the at least one second display panel by the user, when the first calibration brightness of the at least one second display panel is inconsistent with the brightness of the at least one second display panel which is actually observed.

Further, the determining module includes: a first displaying module configured to display a display image which is the same as a display image displayed on the at least one first display panel on the at least one second display panel based on the first calibration brightness; and a determining sub-module configured to determine, according to a brightness of the display image of the at least one second display panel and a brightness of the display image of the at least one first display panel, whether the first calibration brightness of the at least one second display panel is consistent with the brightness of the at least one second display panel which is actually observed.

Further, the first obtaining module includes: a second displaying module configured to display a display image which is the same as a display image displayed on the at least one first display panel on the at least one second display panel; and a first calibration information obtaining sub-module configured to obtain the first calibration information of the at least one first display panel by the calibration instrument, wherein the first calibration information includes a first display brightness of the at least one first display panel and a second display brightness of the at least one second display panel.

Further, the second obtaining module includes: a grayscale range obtaining module configured to obtain a range of grayscales of the at least one second display panel; a binding point grayscale selecting module configured to select at least one binding point grayscale within the range of the grayscales of the at least one second display panel; and a first obtaining sub-module configured to obtain the second calibration information of the at least one second display panel by the user according to the at least one binding point grayscale, wherein the second calibration information includes a brightness of the at least one second display panel corresponding to the at least one binding point grayscale.

Further, the third calibrating module includes: a first gain coefficient identifying module configured to generate a first gain coefficient corresponding to the at least one binding point grayscale according to the first calibration brightness and the second calibration brightness; a second gain coefficient identifying module configured to perform a linear interpolation based on the first gain coefficient corresponding to the at least one binding point grayscale to obtain a second gain coefficient corresponding to a brightness of the at least one second display panel at each level; and a third calibrating sub-module configured to perform the third calibration on the brightness of the at least one second display panel according to the second gain coefficient to obtain the third calibration brightness of the at least one second display panel.

Further, a display image of the display includes a plurality of colors, and the first calibration brightness, the second calibration brightness, and the third calibration brightness respectively correspond to the colors of the display image of the display.

Further, the calibration instrument includes a colorimeter or a spectrometer.

Further, a range of grayscales of the at least one second display panel is the same as a range of grayscales of the at least one first display panel.

Further, the at least one first display panel is an LCD display panel, and the at least one second display panel is an LED display panel.

Advantageous Effects

The first calibration information of the at least one first display panel is obtained by the calibration instrument, and the first calibration is performed on the brightness of the at least one second display panel according to the first calibration information to obtain the first calibration brightness of the at least one second display panel. Then, the second calibration information of the at least one second display panel is obtained by the user, and the second calibration is performed on the brightness of the at least one second display panel according to the second calibration information to obtain the second calibration brightness of the at least one second display panel. Finally, the third calibration is performed on the brightness of the at least one second display panel according to the first calibration brightness and the second calibration brightness to obtain the third calibration brightness of the at least one second display panel to match the brightness of the at least one second display panel with the brightness of the at least one first display panel. In the present disclosure, the problem that the brightness of the at least one second display in a splicing screen is inconsistent with the brightness of the at least one first display panel is solved, and a difference between the brightness of the at least one second display panel which is calibrated and the brightness of the at least one second display panel which is actually observed is avoided. As such, the consistency of the display effect of the at least one second display panel and the at least one first display panel is increased.

BRIEF DESCRIPTION OF DRAWINGS

The technical solution and the beneficial effect of the present disclosure are best understood from the following detailed description with reference to the accompanying figures and embodiments.

DETAILED DESCRIPTION OF EMBODIMENTS

Figure 1:
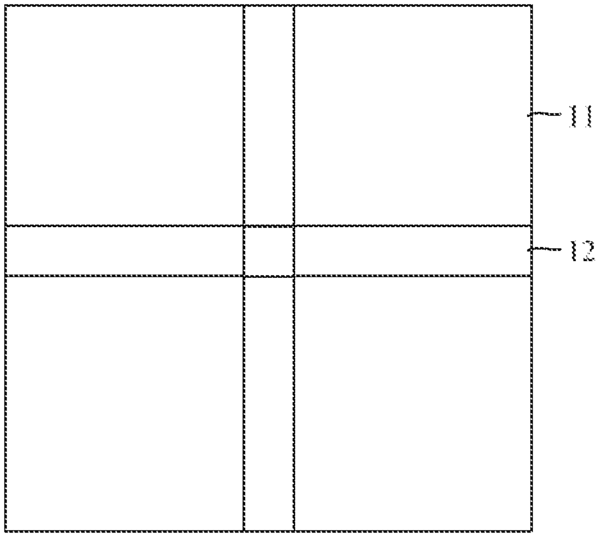
FIG. 1 illustrates a schematic diagram of a display according to an embodiment of the present application.

The following clearly describes the technical solutions in the embodiments of the present disclosure with reference to the accompanying drawings in the embodiments of the present disclosure. The described embodiments are some rather than all of the embodiments of the present disclosure. All other embodiments obtained by those skilled in the art based on the embodiments of the present disclosure without creative efforts shall fall within the protection scope of the present disclosure.

In the description of the present disclosure, it should be understood that orientations or position relationships indicated by the terms "center", "longitudinal", "lateral", "length", "width", "thickness", "upper", "lower", "front", "rear", "left", "right", "vertical", "horizontal", "top", "bottom", "inside", "outside", "clockwise", and "counter-clockwise" are based on orientations or position relationships illustrated in the drawings. The terms are used to facilitate and simplify the description of the present disclosure, rather than indicate or imply that the devices or elements referred to herein is required to have specific orientations or be constructed or operates in the specific orientations. Accordingly, the terms should not be construed as limiting the present disclosure. Furthermore, the terms "first" and "second" are for descriptive purposes only and should not be construed as indicating or implying relative importance or implying the number of technical features. As such, the features defined by the term "first" and "second" may include one or more of the features explicitly or implicitly. In the description of the present disclosure, the term "more" refers two or more than two, unless otherwise specifically defined.

In the description of the present disclosure, it should be noted that unless otherwise clearly defined and limited, the terms "mounted", "connected/coupled", and "connection" should be interoperated broadly. For example, the terms may refer to a fixed connection, a detachable connection, or an integral connection; the terms may also refer to a mechanical connection, an electrical connection, or communication with each other; the terms may further refer to a direct connection, an indirect connection through an intermediary, or an interconnection between two elements or interactive relationship between two elements. Those skilled in the art can understand the specific meanings of the above-mentioned terms in the present disclosure according to circumstances.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated by those skilled in the art. In some embodiments, methods, means, elements, and circuits well known to those skilled in the art are not described in detail, so as to highlight the gist of the present disclosure.

The present disclosure mainly provides a brightness matching method of a display. The display includes at least one first display panel and at least one second display panel. The at least one first display panel and the at least one second display panel are spliced together. The brightness matching method of the display includes: obtaining first calibration information of the at least one first display panel by a calibration instrument; performing first calibration on a brightness of the at least one second display panel according to the first calibration information to obtain a first calibration brightness of the at least one second display panel; obtaining second calibration information of the at least one second display panel by a user; performing second calibration on the brightness of the at least one second display panel according to the second calibration information to obtain a second calibration brightness of the at least one second display panel; and performing third calibration on the brightness of the at least one second display panel according to the first calibration brightness and the second calibration brightness to obtain a third calibration brightness of the at least one second display panel to match the brightness of the at least one second display panel with a brightness of the at least one first display panel.

The first calibration information of the at least one first display panel is obtained by the calibration instrument, and the first calibration is performed on the brightness of the at least one second display panel according to the first calibration information to obtain the first calibration brightness of the at least one second display panel. Then, the second calibration information of the at least one second display panel is obtained by the user, and the second calibration is performed on the brightness of the at least one second display panel according to the second calibration information to obtain the second calibration brightness of the at least one second display panel. Finally, the third calibration is performed on the brightness of the at least one second display panel according to the first calibration brightness and the second calibration brightness to obtain the third calibration brightness of the at least one second display panel to match the brightness of the at least one second display panel with the brightness of the at least one first display panel. In the present disclosure, the problem that the brightness of the at least one second display in a splicing screen is inconsistent with the brightness of the at least one first display panel is solved, and a difference between the brightness of the at least one second display panel which is calibrated and the brightness of the at least one second display panel which is actually observed is avoided. As such, consistency of display effect of the at least one second display panel and the at least one first display panel is increased.

FIG. 1 illustrates a schematic diagram of a display according to an embodiment of the present application.

As shown in FIG. 1, the display in the embodiment of the present disclosure can include at least one first display panel and at least one second display panel. The at least one first display panel and the at least one second display panel are spliced. Exemplarily, the at least one first display panel can be an LCD screen, and the at least one second display panel can be an LED screen.

In FIG. 1, the display includes 4 LCD screens and 4 LED screens. At least one of the LED screens is disposed at a periphery of each of the LCD screens. Each of the LED screens can be disposed between a seam of two corresponding ones of the LCE screens. For example, in FIG. 1, the LED screens 12 can be disposed at the peripheries of the LCD screens 11. It can be understood that FIG. 1 is exemplary. The LCD screens and the LED screens in FIG. 1 can extend outwardly all around, and a splicing method of the LCD screens and the LED screens in the display is not limited in the present disclosure.

Figure 2:
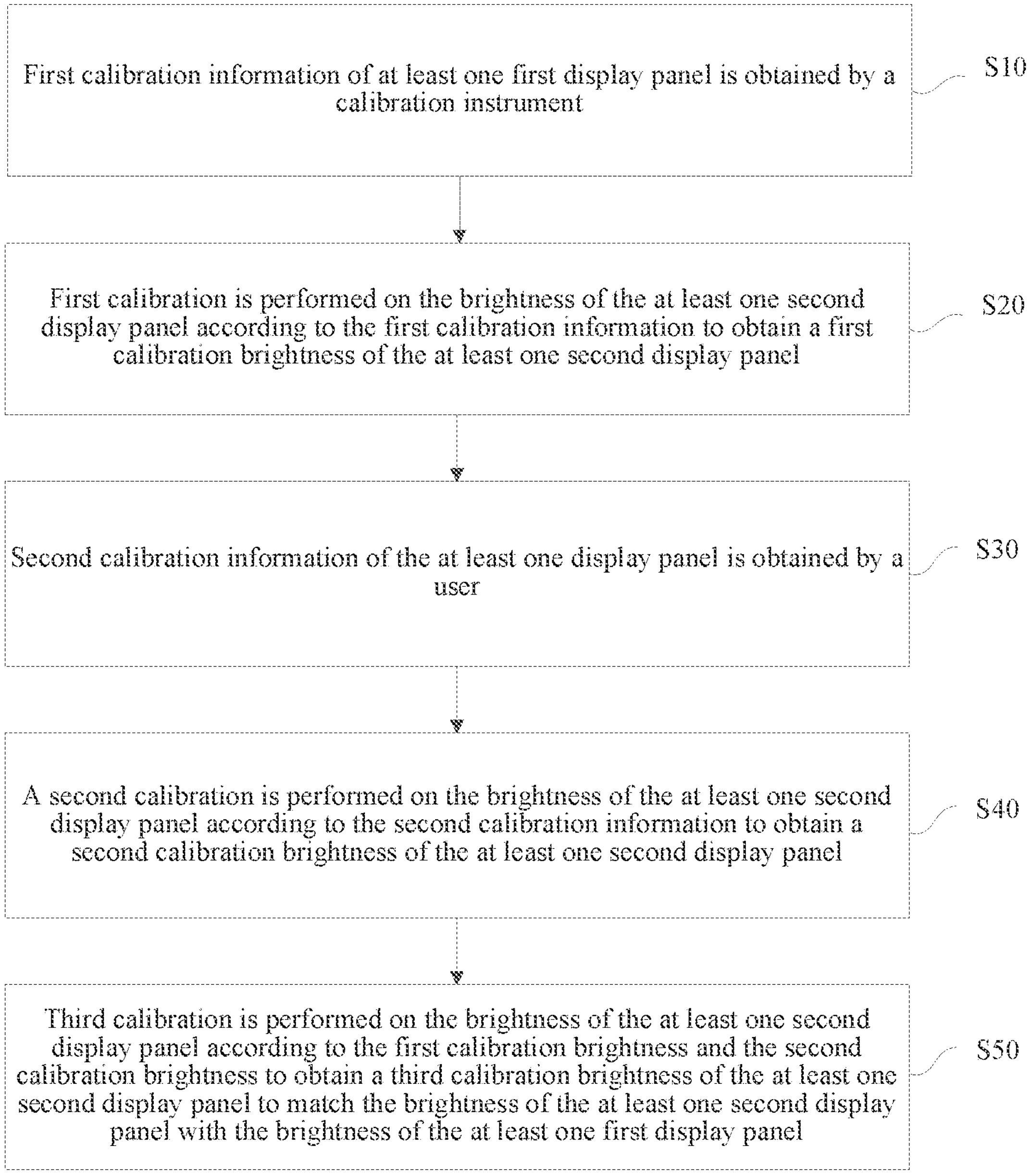
FIG. 2 illustrates a flowchart of a brightness matching method of a display according to an embodiment of the present application.

FIG. 2 illustrates a flowchart of a brightness matching method of a display according to an embodiment of the present application.

As shown in FIG. 2, in the embodiment of the present disclosure, the brightness matching method of the display can include the following steps.

In step S10, first calibration information of at least one first display panel is obtained by a calibration instrument.

The calibration instrument includes a colorimeter or a spectrometer. The colorimeter or the spectrometer can be used for measuring a brightness of a display panel in the embodiments of the present disclosure. It is simple and convenient to measure the brightness of the display panel using the colorimeter or the spectrometer. It can be understood that in practical applications, other equipment or devices can also be used for measuring the brightness of the screen. In the present disclosure, a method of how to measure the brightness of the display panel is not limited.

Further, the obtaining the first calibration information of the at least one first display panel by the calibration instrument includes the following steps.

In step S101, a display image which is the same as a display image displayed on the at least one first display panel is displayed on the at least one second display panel.

In step S102, the first calibration information of the at least one first display panel is obtained by the calibration instrument, wherein the first calibration information includes a first display brightness of the at least one first display panel and a second display brightness of the at least one second display panel.

Since it is necessary to adapt the brightness of the at least one second display panel to the brightness of the at least one first display panel, the same display image can be inputted to the at least one second display panel and the at least one first display panel, so that a difference between the brightness of the at least one second display panel and the brightness of the at least one first display panel is obtained when the same display image is displayed. The display image can be a completely white picture, a completely black picture, or other pictures with any colors. By inputting the same display image to the at least one second display panel and the at least one first display panel, it is convenient to compare to obtain the difference between the brightness of the at least one second display panel and the brightness of the at least one first display panel and to facilitate subsequent calibration.

In an example, the first display panels are LCD screens. Any one of the first display panels can include a plurality of pixel units arranged in rows and columns. Each of the pixel units can include three different types of sub-pixel units, such as a red sub-pixel unit, a green sub-pixel unit, and a blue sub-pixel unit. Each of the sub-pixel units can be configured to display one of a red color (i.e., R), a green color (i.e., G), or a blue color (i.e., B). It can be understood that the sub-pixel units can also have other types, such as white sub-pixel units. The types of the sub-pixel units are not limited in present disclosure.

In the example, the first display panels are LCD screens. In any one of the first display panels, each of the pixel units can be electrically connected to a data line, and each row of pixel units can be connected to a scan line. Each of the pixel units can be provided with a thin film transistor. When the scan line corresponding to a row of pixel units is turned on, all the thin film transistors in the row of pixel units can be turned on, so that display data of corresponding data lines can be written into the corresponding pixel units to drive the display panel to display an image.

Further, the display data corresponding to each of the pixel units can include grayscale data. For example, each of the sub-pixel units can be correspondingly provided with a grayscale. Grayscales can represent the different brightness of each color from a darkest level to a brightest level. In an example of an 8-bit grayscale, the grayscales of an LCD screen can be represented in a range with a total of 256 levels from 0 to 255. A maximum grayscale is 255. Certainly, for different types of display screens, a number and a representation of grayscales can be different. For example, grayscales can also be represented by a 10-bit binary, and a range of the grayscales can be from 0 to 1023 accordingly. It can be understood that the number and the representation of grayscales are not limited in the present disclosure.

Further, a range of grayscales of the at least one second display panel is the same as the range of the grayscales of the at least one first display panel. Exemplarily, the range of the grayscales of the at least one second display panel can also be from 0 to 255. Certainly, in practical applications, the range of the grayscales of the at least one second display panel and the range of the grayscales of the at least one first display panel can also be different according to requirements of specific situations.

In step S20, first calibration is performed on the brightness of the at least one second display panel according to the first calibration information to obtain a first calibration brightness of the at least one second display panel.

For example, the first calibration in the embodiment of the present disclosure can adopt point-by-point calibration. Specifically, in a process of the first calibration, the point-by-point calibration can be used for collecting a brightness of each of the pixel units of the at least one second display panel, comparing the brightness of each of the pixel units of the at least one second display panel with the brightness of the corresponding first display panel (i.e., the first display brightness), calibrating the brightness of the at least one second display panel (i.e., the second display brightness) according to the brightness of the corresponding first display panel, so as to obtain the first calibration brightness of the at least one second display panel after the first correction. It can be understood that other correction methods can also be used for the first calibration. Methods for the first calibration are not limited in the present disclosure.

In the practical application process, an error exists between the first calibration brightness after the first calibration and a brightness of the at least one second display panel which is actually observed. Therefore, further calibration is required to eliminate the error between the brightness of the at least one second display panel generated by the first calibration and the brightness of the at least one second display panel which is actually observed.

In step S30, second calibration information of the at least one display panel is obtained by a user.

The obtaining the second calibration information of the at least one display panel by the user includes the following steps.

In step S301, the range of the grayscales of the at least one second display panel is obtained.

In step S302, at least one binding point grayscale is selected within the range of the grayscales of the at least one second display panel.

In step S303, the second calibration information of the at least one second display panel is obtained by the user according to the at least one binding point grayscale, wherein the second calibration information includes a brightness of the at least one second display panel corresponding to the at least one binding point grayscale.

Further, the range of the grayscales of the at least one second display panel is obtained. The range of the grayscales of the at least one second display panel can be the overall range of the grayscales of the at least one second display panel, for example, the grayscales 0-255. The range of the grayscales of the at least one second display panel can also be a part of the range of the grayscales of the at least one second display panel. For example, the grayscales 0-128 within the grayscales 0-255 are selected as the range of the grayscales of the at least one second display panel. It can be understood that the range of the grayscales of the at least one second display panel is not limited in the present disclosure.

Further, the range of the grayscales of the at least one second display panel is the same as the range of the grayscales of the at least one first display panel. The at least one binding point grayscale is selected within the range of grayscale of the at least one second display panel. For example, 7 binding point grayscales are selected within the grayscales 0-255. Exemplarily, the grayscales of the binding points can be set to 16, 32, 48, 64, 80, 96, and 112. Each of the binding point grayscales can correspondingly drive the at least one display panel to display a brightness corresponding to each of the binding point grayscales. It should be noted that since the same display image is inputted to the at least one first display panel and the at least one second display panel input when the brightness of the at least one second panel is compared with the brightness of the at least one first display panel, binding point grayscales of the at least one first display panel can also be correspondingly set to be the same as the binding point grayscales of the at least one second display panel. The range of the grayscales of the at least one second display panel is the same as the range of the grayscales of the at least one first display panel. Accordingly, in the embodiment of the present disclosure, calibration complexity can be reduced and calibration efficiency can be improved, when correspondence of the grayscales and the brightness is processed.

Further, the second calibration information of the at least one second display panel is obtained by the user according to the at least one binding point grayscale. The second calibration information includes the brightness of the at least one second display panel corresponding to the at least one binding point grayscale. That is, the second calibration information corresponds to the at least one binding point grayscale. Furthermore, the second correction information can further include the brightness of the at least one first display panel corresponding to the at least one binding point grayscale.

By selecting the at least one binding point grayscale within the range of the grayscales of the at least one second display panel and performing the second calibration according to the at least one binding point grayscale in the embodiment of the present disclosure, calibration quality can be ensured, and the workload of the calibration process can be simplified.

Further, the obtaining the second calibration information of the at least one second display panel by the user can further include the following steps.

In step S300, it is determined whether the first corrected brightness of the at least one second display panel is consistent with the brightness of the at least one second display panel which is actually observed.

In step S301, the second calibration information of the at least one second display panel is obtained by the user, when the first calibration brightness of the at least one second display panel is inconsistent with the brightness of the at least one second display panel which is actually observed.

The brightness of the at least one second display panel which is actually observed can a brightness of the at least one second display panel which is actually observed by naked eyes.

The first calibration brightness of the at least one second display panel can be an ideal brightness after the first calibration. A difference exists between the brightness of the at least one second display panel which is actually observed and the first calibration brightness of the at least one second display panel. Accordingly, by comparing the brightness of the at least one second display panel which is actually observed with the first calibration brightness of the at least one second display panel in the present embodiment, the difference between the brightness of the at least one second display panel which is calibrated and the brightness of the at least one second display panel which is actually observed can be avoided to increase the consistency of the display effect of the at least one second display panel and the at least one first display panel.

Further, the determining whether the first calibration brightness of the at least one second display panel is consistent with the brightness of the at least one second display panel which is actually observed includes the following steps.

In step S3001, a display image which is the same as a display image displayed on the at least one first display panel is displayed on the at least one second display panel based on the first calibration brightness.

In step S3002, it is determined, according to a brightness of the display image of the at least one second display panel and a brightness of the display image of the at least one first display panel, whether the first calibration brightness of the at least one second display panel is consistent with the brightness of the at least one second display panel which is actually observed.

Specifically, based on the first calibration brightness after the first correction, the display image which is the same the display image displayed on the at least one first display panel can be displayed on the at least one second display panel. Then, it is determined whether the brightness, which is observed by the naked eyes, of the at least one second display panel after the first calibration is consistent with the brightness of the at least one second display panel which is actually observed. When the brightness of the at least one second display panel after the first calibration is consistent with the brightness of the at least one second display panel which is actually observed, it represents that the brightness of the at least one second display panel after the first calibration meets the practical situation. Accordingly, a subsequent calibration is not required. When the brightness of the at least one second display panel after the first calibration is inconsistent with the brightness of the at least one second display panel which is actually observed, it represents that the brightness of the at least one second display panel after the first calibration does not meet the practical situation. It is necessary to further calibrate the brightness of the at least one second display panel.

By determining, according to the brightness of the display image of the at least one second display panel and the brightness of the display image of the at least one first display panel, whether the first calibration brightness of the at least one second display panel is consistent with the brightness of the at least one second display panel which is actually observed in the embodiment of the present disclosure, it is easy and convenient to implement the consistency of the first calibration and the second calibration can be ensured.

In step S40, a second calibration is performed on the brightness of the at least one second display panel according to the second calibration information to obtain a second calibration brightness of the at least one second display panel.

For ease of use, the second calibration can be performed, by the naked eyes, on the brightness of the at least one second display panel according to the second calibration information. That is, the second calibration can be manually performed on the brightness of the at least one second display panel can be manually calibrated according to the second calibration information. Certainly, in practical uses, human eye's observation characteristics on brightness can be simulated the in advance, and the manual second calibration can be replaced by an artificial device to perform the second calibration on the at least one second display panel.

It can be understood that the device used for performing the second calibration on the brightness of the at least one second display panel is not limited in the present disclosure.

Exemplarily, the brightness of the at least one second display panel corresponding to the at least one binding point grayscale is manually calibrated to obtain the second brightness of the at least one second display panel corresponding to the at least one binding point grayscale after the second calibration. That is, the second calibration brightness of the at least one second display panel can correspond to the at least one binding point grayscale and can be adjusted by the second calibration.

In step S50, third calibration is performed on the brightness of the at least one second display panel according to the first calibration brightness and the second calibration brightness to obtain a third calibration brightness of the at least one second display panel to match the brightness of the at least one second display panel with the brightness of the at least one first display panel.

The performing the third calibration on the brightness of the at least one second display panel according to the first calibration brightness and the second calibration brightness to obtain the third calibration brightness of the at least one of the second display panel includes the following steps.

In step S501, a first gain coefficient corresponding to the at least one binding point grayscale is generated according to the first calibration brightness and the second calibration brightness.

In step S502, a linear interpolation is performed based on the first gain coefficient corresponding to the at least one binding point grayscale to obtain a second gain coefficient corresponding to a brightness of the at least one second display panel at each level.

In step S503, the third calibration is performed on the brightness of the at least one second display panel according to the second gain coefficient to obtain the third calibration brightness of the at least one second display panel.

Further, the first gain coefficient corresponding to the at least one binding point grayscale is generated according to the first calibration brightness and the second calibration brightness. For example, in the case where there are 7 binding point grayscales, ratios of the second calibration brightness after the second calibration to the first calibration brightness after the first calibration are served as the first gain coefficients corresponding to the 7 binding point grayscales.

Further, the linear interpolation is performed based on the gain coefficient corresponding to the at least one binding point grayscale to obtain the second gain coefficient corresponding to the brightness of the at least one second display panel at each level. The brightness of the at least one second display panel can be represented by 16 bits. That is, the brightness of the at least one second display panel can be divided into a level 0 to a level 65535. The grayscales of the at least one second display panel can correspond to the brightness of the at least one second display panel. For example, in the embodiment of the present disclosure, 7 binding point grayscales are selected. After the brightness of the at least one second display panel is calibrated under the 7 binding point grayscales, a one-dimensional linear interpolation can be performed based on the first gain coefficient corresponding to the at least one binding point grayscale to obtain each brightness corresponding to the level 0 to level 65535. That is, the brightness corresponding to the 8-bit grayscale is expanded to the brightness corresponding to the 16-bit brightness by the linear interpolation, thereby obtaining the second gain coefficients corresponding to the brightness at 65536 levels.

Further, the third calibration is performed on the brightness of the at least one second display panel according to the second gain coefficient to obtain the third calibration brightness of the at least one second display panel. For example, there are 65536 second gain coefficients. That is, the second gain coefficient corresponding to the brightness of the at least one second display panel at each level can be obtained. A calculation (e.g., multiplication) can be performed on the second gain coefficient and the first calibration brightness of the at least one second display panel to obtain the third calibration brightness of the at least one second display panel.

By generating the first gain coefficient corresponding to the at least one binding point grayscale according to the first calibration brightness and the second calibration brightness and performing the linear interpolation based on the first gain coefficient to perform the third calibration on the brightness of the at least one second display panel in the embodiment of the present disclosure, the calibration of the selected binding point grayscale can be expanded to all grayscales of the at least one second display panel. An amount of calculations in the calibration process can be decreased, and the accuracy of the brightness calibration of the at least one second display panel can be increased.

Further, a display image of the display includes a plurality of colors. The first calibration brightness, the second calibration brightness, and the third calibration brightness respectively correspond to the colors of the display image of the display. For example, the plurality of colors can include a red color (i.e., R), a green color (i.e., G), and a blue color (i.e., B). Therefore, in the embodiment of the present disclosure, the corresponding grayscales corresponding to the colors can be traversed according to the above-mentioned method. The brightness of the at least one second display panel can be adjusted to obtain a brightness table of the at least one second display panel corresponding to the colors. Finally, the brightness table is imported to a control system (e.g., a timing controller) in the display panel, so that the brightness of the at least one second display panel is consistent with the brightness of the at least one first display panel to guarantee the consistency of the display effect of the at least one second display panel and the at least one first display panel.

By traversing the colors of the display panel in the embodiment of the present disclosure, integrity of the calibration process can be ensured, and application ranges of the calibration process can be expanded. As such, the accuracy of the brightness calibration of the at least one second display panel can be further increased.

Figure 3:
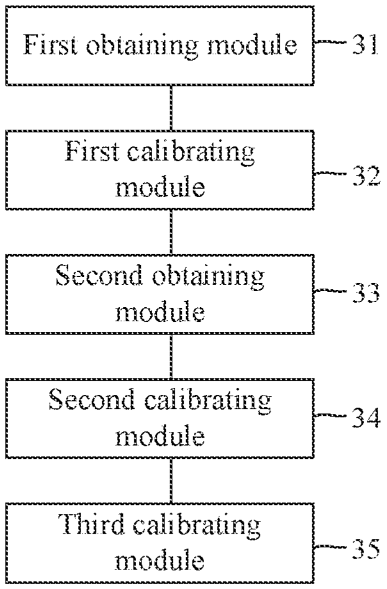
FIG. 3 illustrates a block diagram of a display according to an embodiment of the present disclosure.

FIG. 3 illustrates a block diagram of a display according to an embodiment of the present disclosure.

As shown in FIG. 3, the present disclosure further provides a display. The display includes: a first obtaining module 31 electrically connected to a first calibrating module, wherein the first obtaining module is configured to obtain first calibration information of at least one first display panel by a calibration instrument; the first calibrating module 32 electrically connected to the first obtaining module and a second obtaining module, wherein the second obtaining module is configured to perform first calibration on a brightness of at least one second display panel according to the first calibration information to obtain a first calibration brightness of the at least one second display panel; the second obtaining module 33 electrically connected to the first calibrating module and a second calibrating module, wherein the second calibrating module is configured to obtain second calibration information of the at least one second display panel by a user; the second calibrating module 34 electrically connected to the second obtaining module and a third calibrating module, wherein the second calibrating module is configured to perform second calibration on the brightness of the at least one second display panel according to the second calibration information to obtain a second calibration brightness of the at least one second display panel; and the third calibrating module 35 electrically connected to the second calibrating module, wherein the third calibrating module is configured to perform third calibration on the brightness of the at least one second display panel according to the first calibration brightness and the second calibration brightness to obtain a third calibration brightness of the at least one second display panel to match the brightness of the at least one second display panel with a brightness of the at least one first display panel.

It should be noted that the display in the embodiment of the present disclosure can be used for implementing the brightness matching method of the display. Specific details of performing the brightness matching method of the display can be referred to the applications of the above-mentioned embodiments and are not repeated herein.

In summary, in the embodiments of the present disclosure, the first calibration information of the at least one first display panel is obtained by the calibration instrument, and the first calibration is performed on the brightness of the at least one second display panel according to the first calibration information to obtain the first calibration brightness of the at least one second display panel. Then, the second calibration information of the at least one second display panel is obtained by the user, and the second calibration is performed on the brightness of the at least one second display panel according to the second calibration information to obtain the second calibration brightness of the at least one second display panel. Finally, the third calibration is performed on the brightness of the at least one second display panel according to the first calibration brightness and the second calibration brightness to obtain the third calibration brightness of the at least one second display panel to match the brightness of the at least one second display panel with the brightness of the at least one first display panel. In the present disclosure, the problem that the brightness of the at least one second display in a splicing screen is inconsistent with the brightness of the at least one first display panel is solved, and a difference between the brightness of the at least one second display panel which is calibrated and the brightness of the at least one second display panel which is actually observed is avoided. As such, the consistency of the display effect of the at least one second display panel and the at least one first display panel is increased.

In the above-mentioned embodiments, description for the embodiments emphasizes different aspects, and for a part without being described in detail in a certain embodiment, reference may be made to related description in other embodiments.

The brightness matching method and the display provided by the embodiments of the present disclosure are described in detail above. Although the principles and implementations of the present disclosure are described by using specific examples in this specification, the above-mentioned description of the embodiments is only intended to help understand the technical solutions and the core idea of the present disclosure. Those skilled in the art should understand that they may still make modifications to the technical solutions described in the above-mentioned embodiments or make equivalent replacements to some technical features thereof These modifications or equivalent replacements do not depart from the spirit and scope of the technical solutions of the embodiments of the present disclosure.

What is claimed is:

1. A brightness matching method of a display, wherein the display comprises at least one first display panel and at least one second display panel, the at least one first display panel and the at least one second display panel are spliced together, the brightness matching method of the display comprises:

obtaining first calibration information of the at least one first display panel by a calibration instrument;

performing first calibration on a brightness of the at least one second display panel according to the first calibration information to obtain a first calibration brightness of the at least one second display panel;

obtaining second calibration information of the at least one second display panel by a user;

performing second calibration on the brightness of the at least one second display panel according to the second calibration information to obtain a second calibration brightness of the at least one second display panel, wherein at least one binding point grayscale within a range of grayscales of the at least one second display panel is selected; and performing third calibration on the brightness of the at least one second display panel according to the first calibration brightness and the second calibration brightness to obtain a third calibration brightness of the at least one second display panel to match the brightness of the at least one second display panel with a brightness of the at least one first display panel;

wherein the performing the third calibration on the brightness of the at least one second display panel according to the first calibration brightness and the second calibration brightness to obtain the third calibration brightness of the at least one second display panel comprises:

generating a first gain coefficient corresponding to the at least one binding point grayscale according to the first calibration brightness and the second calibration brightness;

performing a linear interpolation based on the first gain coefficient corresponding to the at least one binding point grayscale to obtain a second gain coefficient corresponding to a brightness of the at least one second display panel at each level; and performing the third calibration on the brightness of the at least one second display panel according to the second gain coefficient to obtain the third calibration brightness of the at least one second display panel.

2. The brightness matching method of the display of claim 1, wherein the obtaining the second calibration information of the at least one second display panel by the user comprises:

determining whether the first corrected brightness of the at least one second display panel is consistent with the brightness of the at least one second display panel which is actually observed; and obtaining the second calibration information of the at least one second display panel by the user, when the first calibration brightness of the at least one second display panel is inconsistent with the brightness of the at least one second display panel which is actually observed.

3. The brightness matching method of the display of claim 2, wherein the determining whether the first corrected brightness of the at least one second display panel is consistent with the brightness of the at least one second display panel which is actually observed comprises:

displaying a display image which is the same as a display image displayed on the at least one first display panel on the at least one second display panel based on the first calibration brightness; and determining, according to a brightness of the display image of the at least one second display panel and a brightness of the display image of the at least one first display panel, whether the first calibration brightness of the at least one second display panel is consistent with the brightness of the at least one second display panel which is actually observed.

4. The brightness matching method of the display of claim 1, wherein the obtaining the first calibration information of the at least one first display panel by the calibration instrument comprises:

displaying a display image which is the same as a display image displayed on the at least one first display panel on the at least one second display panel; and obtaining the first calibration information of the at least one first display panel by the calibration instrument, wherein the first calibration information comprises a first display brightness of the at least one first display panel and a second display brightness of the at least one second display panel.

5. The brightness matching method of the display of claim 4, wherein the obtaining the second calibration information of the at least one second display panel by the user comprises:

obtaining the range of the grayscales of the at least one second display panel;

and obtaining the second calibration information of the at least one second display panel by the user according to the at least one binding point grayscale, wherein the second calibration information comprises a brightness of the at least one second display panel corresponding to the at least one binding point grayscale.

6. The brightness matching method of the display of claim 1, wherein a display image of the display comprises a plurality of colors, and the first calibration brightness, the second calibration brightness, and the third calibration brightness respectively correspond to the colors of the display image of the display.

7. The brightness matching method of the display of claim 1, wherein the calibration instrument comprises a colorimeter or a spectrometer.

8. The brightness matching method of the display of claim 1, wherein a range of grayscales of the at least one second display panel is the same as a range of grayscales of the at least one first display panel.

9. The brightness matching method of the display of claim 1, wherein the at least one first display panel is an LCD display panel, and the at least one second display panel is an LED display panel.

10. A display, wherein the display comprises at least one first display panel and at least one second display panel, the at least one first display panel and the at least one second display panel are spliced together, the display device comprises:

a first obtaining module electrically connected to a first calibrating module, wherein the first obtaining module is configured to obtain first calibration information of at least one first display panel by a calibration instrument;

the first calibrating module electrically connected to the first obtaining module and a second obtaining module, wherein the second obtaining module is configured to perform first calibration on a brightness of at least one second display panel according to the first calibration information to obtain a first calibration brightness of the at least one second display panel;

the second obtaining module electrically connected to the first calibrating module and a second calibrating module, wherein the second calibrating module is configured to obtain second calibration information of the at least one second display panel by a user;

the second calibrating module electrically connected to the second obtaining module and a third calibrating module, wherein the second calibrating module is configured to perform second calibration on the brightness of the at least one second display panel according to the second calibration information to obtain a second calibration brightness of the at least one second display panel; and the third calibrating module electrically connected to the second calibrating module, wherein the third calibrating module is configured to perform third calibration on the brightness of the at least one second display panel according to the first calibration brightness and the second calibration brightness to obtain a third calibration brightness of the at least one second display panel to match the brightness of the at least one second display panel with a brightness of the at least one first display panel;

wherein the second obtaining module comprises a binding point grayscale selecting module configured to select at least one binding point grayscale within the range of the grayscales of the at least one second display panel; and wherein the third calibrating module comprises:

a first gain coefficient identifying module configured to generate a first gain coefficient corresponding to the at least one binding point grayscale according to the first calibration brightness and the second calibration brightness;

a second gain coefficient identifying module configured to perform a linear interpolation based on the first gain coefficient corresponding to the at least one binding point grayscale to obtain a second gain coefficient corresponding to a brightness of the at least one second display panel at each level; and a third calibrating sub-module configured to perform the third calibration on the brightness of the at least one second display panel according to the second gain coefficient to obtain the third calibration brightness of the at least one second display panel.

11. The display of claim 10, wherein the second obtaining module comprises:

a determining module configured to determining whether the first corrected brightness of the at least one second display panel is consistent with the brightness of the at least one second display panel which is actually observed; and a second calibration information obtaining sub-module configured to obtain the second calibration information of the at least one second display panel by the user, when the first calibration brightness of the at least one second display panel is inconsistent with the brightness of the at least one second display panel which is actually observed.

12. The display of claim 11, wherein the determining module comprises:

a first displaying module configured to display a display image which is the same as a display image displayed on the at least one first display panel on the at least one second display panel based on the first calibration brightness; and a determining sub-module configured to determine, according to a brightness of the display image of the at least one second display panel and a brightness of the display image of the at least one first display panel, whether the first calibration brightness of the at least one second display panel is consistent with the brightness of the at least one second display panel which is actually observed.

13. The display of claim 10, wherein the first obtaining module comprises:

a second displaying module configured to display a display image which is the same as a display image displayed on the at least one first display panel on the at least one second display panel; and a first calibration information obtaining sub-module configured to obtain the first calibration information of the at least one first display panel by the calibration instrument, wherein the first calibration information comprises a first display brightness of the at least one first display panel and a second display brightness of the at least one second display panel.

14. The display of claim 13, wherein the second obtaining module further comprises:

a grayscale range obtaining module configured to obtain the range of the grayscales of the at least one second display panel;

and a first obtaining sub-module configured to obtain the second calibration information of the at least one second display panel by the user according to the at least one binding point grayscale, wherein the second calibration information comprises a brightness of the at least one second display panel corresponding to the at least one binding point grayscale.

15. The display of claim 10, wherein a display image of the display comprises a plurality of colors, and the first calibration brightness, the second calibration brightness, and the third calibration brightness respectively correspond to the colors of the display image of the display.

16. The display of claim 10, wherein the calibration instrument comprises a colorimeter or a spectrometer.

17. The display of claim 10, wherein a range of grayscales of the at least one second display panel is the same as a range of grayscales of the at least one first display panel.

18. The display of claim 10, wherein the at least one first display panel is an LCD display panel, and the at least one second display panel is an LED display panel.

* * * * *